Figure 1:
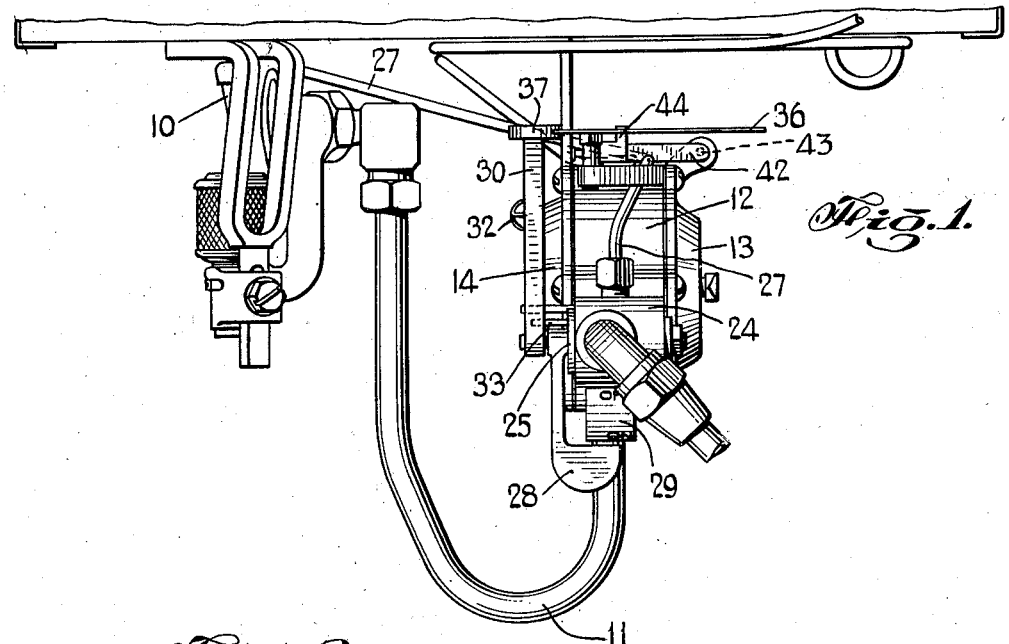

INVENTOR.
S. RUPPRICHT

Feb. 26, 1935.  S. RUPPRICHT  1,992,842
CONTROL FOR ABSORPTION REFRIGERATING APPARATUS
Filed Aug. 14, 1931  2 Sheets-Sheet 2
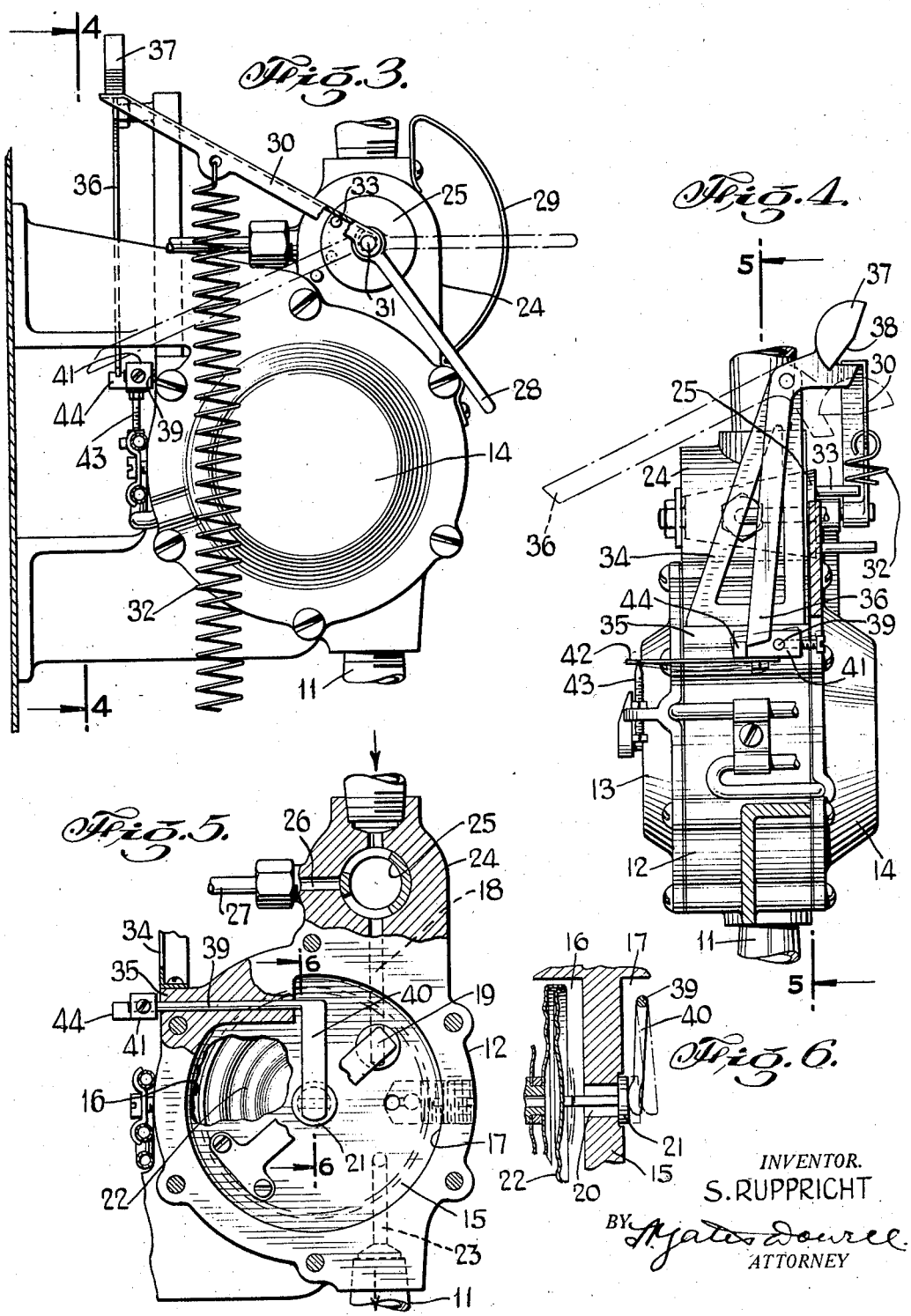
INVENTOR.
S. RUPPRICHT
BY
ATTORNEY Patented Feb. 26, 1935

1,992,842

UNITED STATES PATENT OFFICE 1,992,842

CONTROL FOR ABSORPTION REFRIGERATING APPARATUS

Siegfried Ruppricht, New York, N. Y., assignor to Electrolux Servel Corporation, New York, N. Y., a corporation of Delaware Application August 14, 1931, Serial No. 557,072

27 Claims. (Cl. 62—5)

This invention relates to refrigeration and more particularly to control of refrigerating systems of the absorption type.

In refrigerators of this type, a solution of refrigerant in an absorption liquid is heated in a generator to expel the refrigerant gas from solution. The expelled gas, under generator pressure, is liquefied by cooling in a condenser and the liquid refrigerant is then vaporized in an evaporator, absorbing heat from the surrounding medium, thereby producing refrigeration. Refrigerant gas from the evaporator is again absorbed by the absorption liquid and the cycle is repeated.

In continuous absorption systems of the pressure equalized type, the refrigerant in the evaporator evaporates into an inert pressure equalizing gas such as hydrogen, and the resulting gas mixture flows into an absorber where the refrigerant gas is absorbed out of the mixture by weak absorption liquid from the generator. The inert gas returns to the evaporator and the enriched absorption liquid is returned to the generator, for instance, by means of a thermo-siphon pump. The generator is preferably heated by means of a fluid fuel burner and the evaporator temperature is maintained substantially constant by controlling the rate at which the refrigerant gas is expelled from solution in the generator, that is, by regulating the size of the burner flame. A safety cut-off may be provided for the burner so that excessively high pressures will not occur in the generator when, for instance, cooling of the condenser is decreased by failure of the cooling water supply.

When such systems are used both for cooling storage compartments and freezing ice cubes or the like, as in household refrigeration, they are operated at an evaporator temperature below freezing and, due to the presence of moisture in the air circulating past the evaporator, a layer of frost builds up which seriously decreases the refrigerating efficiency and is otherwise undesirable. In order to remove the frost it is necessary to interrupt the heating of the generator long enough for the evaporator to reach the temperature at which the frost melts. This is accomplished by cutting off the supply of gas to the burner which must again be lighted after the frost has melted.

Since the rate of accumulation of frost on the evaporator is not uniform, it is desirable that defrosting should be instigated at will, but since returning the apparatus to normal operation is liable to be forgotten after the frost has melted and is, with present arrangements, inconvenient, this is preferably done automatically. The present invention contemplates a control device whereby absorption refrigerators can be defrosted at will by simply moving a lever whereby the burner is turned off. As soon as the frost is melted but before the temperature of the freezing trays in the evaporator passes the melting point, the apparatus automatically resumes its normal operation.

Figure 2:
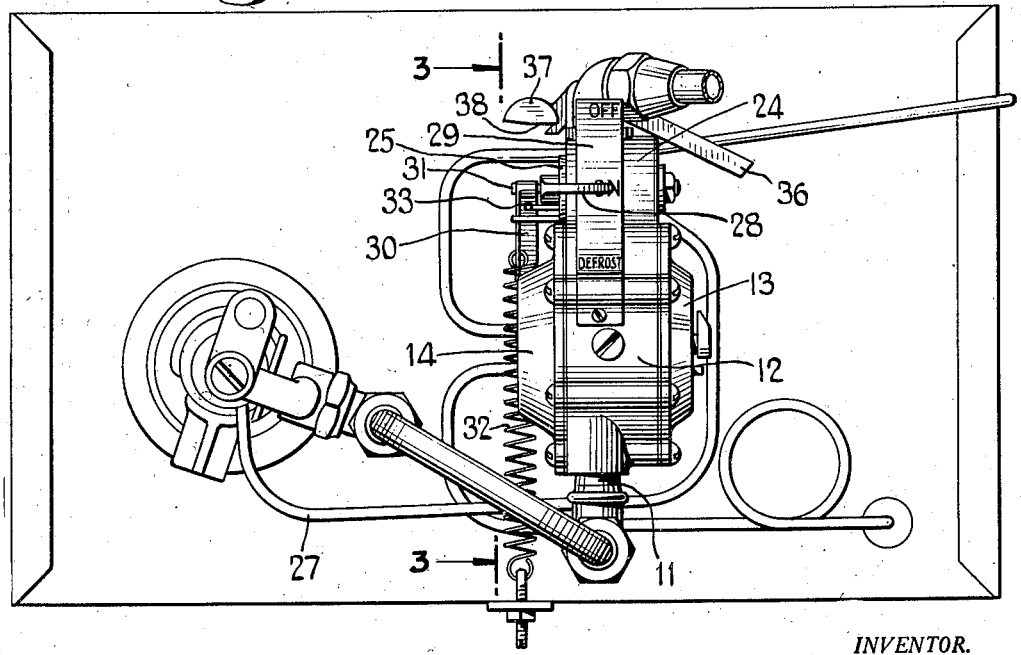

Further objects and advantages will be apparent from the following description taken in connection with the accompanying drawings, in which Fig. 1 is a plan view of a burner and thermostatic control device therefor constructed in accordance with this invention;

Fig. 2 is a front elevation of the apparatus in Fig. 1;

Fig. 3, a view taken on line 3—3 of Fig. 2;

Fig. 4, a section taken on line 4—4 of Fig. 3;

Fig. 5, a section taken on line 5—5 of Fig. 4; and

Fig. 6, a detail section taken on line 6—6 of Fig. 5.

Referring to the drawings, there are shown in Figs. 1 and 2 a gas burner and thermostatically controlled valves in the burner supply line as used in a continuous absorption refrigerating apparatus of the pressure equalized type. Refrigeration apparatus of this type is fully disclosed in United States Letters Patent No. 1,609,334 to von Platen et al. The burner 10, adapted to heat the generator, is supplied with gas through line 11 in which there is a combined automatic valve for regulating the size of the flame responsive to the evaporator temperature and terminating the supply of gas when the temperature in the generator rises above a predetermined safe limit. This combined valve is fully set forth and described in U. S. Patent No. 1,801,300 to Bast. Briefly, the valves are contained within a valve casing consisting of a body section 12 and cover plates 13 and 14. The body section is annular as shown and is divided by a partition 15 into two chambers 16 and 17, as best illustrated in Figs. 5 and 6. Gas enters chamber 17 through conduit 18 in partition 15 in which there is a normally open valve 19 adapted to be closed by a snap acting thermostatic device when the temperature in the generator rises above a predetermined safe maximum. A valve passage 20 in partition 15 is opened and closed by a throttle valve member 21 which is operated by an expansible bellows 22 in chamber 16, which bellows is part of an expansible fluid thermostat having its sensitive bulb located on the cooling element. Gas flows from chamber 16 through conduit 23 to the burner supply line 11.

In accordance with this invention, the body member 12 of the valve casing is constructed with an enlarged boss 24 for the gas inlet connection in which is provided a three-way cock 25 and a port 26 to which is connected a pilot tube 27. The cock 25 is provided with an operating lever 28 which is moved over the position indicating scale 29 attached to the valve casing as shown in Figs. 2 and 3. In the off position of the cock, the conduit 18 is closed outwardly. In the on position, the conduit 18 is open and port 26 to the pilot closed. In the defrost position, the conduit 18 is closed inwardly and port 26 to the pilot is open to the gas supply. The cock 25 is constructed such that the pilot will be supplied with gas before the burner is cut off whereby the pilot burns during the defrosting period and is available for lighting the burner upon resumption of normal operation.

A lever 30 is pivoted at one end on a pin 31 extending from the center of the rotor member of cock 25 and is normally urged to its position shown in dotted lines in Fig. 3 by a spring 32. The lever 30 coacts with a stop pin 33 upon the rotor member of cock 25 in such a manner that when the lever is urged to its normal position the cock 25 is turned to its on position but otherwise the lever and cock are independently movable, and conversely, when the cock is turned by the operating lever 28 to the defrost position, as shown in full lines in Fig. 3, the lever 30 is carried by pin 33 away from its normal position, thus putting the spring 32 under tension.

A supporting frame 34 is attached to a wart 35 on the valve casing 12. At the outer end of frame 34 is pivoted a lever 36 which is balanced by a weight 37 so that it normally assumes the position shown in dotted lines in Fig. 4. The upper end of lever 36 is constructed with a cleft 38 forming a catch such that when the lever 30 is moved from its normal position the end of lever 30 engages the catch and carries lever 36 to its position shown in full lines in Fig. 4, in which position the return of lever 30 to its normal position under the action of spring 32 is prevented.

Journaled in the valve casing 12 is a shaft 39 which is ground in or otherwise assembled to prevent the leakage of gas through the casing, as illustrated in Figs. 4 and 5. On the end of shaft 39 within the casing is attached a lever 40 having its free end overlying the throttle valve 21 whereby opening movement of the valve is transmitted through lever 40 to rotate shaft 39. On the end of the shaft outside of the casing is fastened a lever arm 41 which carries a leaf spring 42. Rotation of the shaft 39 is limited in one direction by the lever arm 40 against the throttle valve 21 and in the other direction by leaf spring 42, the tension of which is adjusted by screw 43. The lever arm 41 also carries a catch 44 which engages the end of lever 36 when it is carried to the position shown in Fig. 4 by turning the control cock to the defrosting position as set forth above.

In operation, when it is desired to defrost the evaporator, the operating lever 28 is manually turned to the position on the scale 29 marked defrost, which moves the control cock 25 to its defrosting position, in which position the supply of gas to the burner is cut off and gas supplied to the pilot which is lighted from the burner flame before the latter goes out. As the control cock is rotated, the pin 33 carries lever 30 away from its normal position, thus putting spring 32 under tension. As lever 30 is moved, it engages the cleft in the upper end of lever 36 and carries the latter until its lower end is engaged by catch 44 on lever arm 41.

The heating of the generator being cut off, the evaporator temperature will rise, allowing the frost to melt. As the evaporator temperature rises, the bellows 22 of the expansible fluid thermostat associated with the evaporator expands opening the throttle valve 21. The latter turns lever arm 40, rotating shaft 39 and lever arm 41 against the action of spring 42. When lever 41 has been rotated sufficiently, the catch 44 releases the end of lever 36 which returns to its normal position shown in dotted lines in Fig. 4. This releases lever 30 which returns to its normal position under the action of spring 32, carrying with it pin 33 whereby the control cock 25 and operating lever 28 are returned to the on position in which gas is again supplied to the burner and the supply of gas to the pilot is cut off, the burner being lighted from the pilot before the latter is cut off.

It will be obvious to those skilled in the art that various changes may be made in the construction and arrangement without departing from the spirit of the invention, and therefore the invention is not limited to what is described in the specification and shown in the drawings but only as indicated in the following claims.

I claim:

1. In continuous absorption refrigerating apparatus, a gas burner for heating the generator, a pilot for said burner, a normally open valve in the burner supply line, manually operable means for closing said valve, means for retaining said valve in its closed position, and means responsive to a predetermined rise in temperature of the cooling element for releasing said retaining means to allow said valve to open.

2. In continuous absorption refrigerating apparatus, a gas burner for heating the generator, a pilot for said burner, a normally open valve in the burner supply line, a catch for retaining said valve in its closed position, and means operative responsive to increase in temperature of the cooling element for releasing said catch to allow said valve to open.

3. In continuous absorption refrigerating apparatus, a gas burner for heating the generator, a pilot for said burner, a normally open valve in the burner supply line, manually operable means for closing said valve, a spring tensioned catch for retaining said valve in its closed position, and a thermostat operative responsive to increase in temperature of the cooling element for releasing said catch to allow said valve to open.

4. In continuous absorption refrigerating apparatus, a gas burner for heating the generator, a pilot for said burner, means for controlling the size of the burner flame to maintain a substantially constant cooling element temperature, a normally open valve in the burner supply line, manually operable means for closing said valve, a catch for retaining said valve in its closed position, and means responsive to an increase in temperature of the cooling element above normal for releasing said catch to allow said valve to open.

5. In continuous absorption refrigerating apparatus, a gas burner for heating the generator, a pilot for said burner, a throttle valve for controlling the size of the burner flame, an expansible fluid thermostat for operating said throttle valve responsive to the temperature of the cooling element, a normally open valve in the burner supply line, manually operable means for closing said normally open valve, a spring tensioned catch for retaining the last mentioned valve in its closed position, and means connecting said catch and said thermostat whereby the former is released by movement of the latter against the tension of the catch.

6. In continuous absorption refrigerating apparatus, a gas burner for heating the generator, a pilot for said burner, a throttle valve for controlling the size of the burner flame, an expansible fluid thermostat for operating said throttle valve to maintain a substantially constant cooling element temperature, a normally open valve in the burner supply line, manually operable means for closing said normally open valve, a catch having adjustable tensioning means for retaining the last mentioned valve in its closed position, and means operative responsive to the opening movement of said throttle valve for overcoming the tension of said catch to release said normally open valve.

7. In continuous absorption refrigerating apparatus, a gas burner for heating the generator, a pilot for said burner, a throttle valve for controlling the size of the burner flame, an expansible fluid thermostat for operating said throttle valve to maintain a substantially constant cooling element temperature, a manually operated three-way valve in the burner supply line for shutting off the gas supply in its first position, allowing the passage of gas to the burner and cutting off gas to the pilot in its second position, and cutting off gas to the burner and admitting gas to the pilot in its third position, spring tensioned leverage for turning said three-way valve from its third to second position, said leverage being displaced to its operative position when the three-way valve is turned to its third position, a spring tensioned catch for retaining said leverage in its displaced position, and means connecting said catch and said throttle valve whereby the former is released by the opening movement of the latter against the tension of the catch.

8. In continuous absorption refrigerating apparatus, a gas burner for heating the generator, a pilot for said burner, means for controlling the size of the burner flame to maintain a substantially constant cooling element temperature, a manually operated three-way valve in the burner supply line for shutting off the gas supply in its first position, allowing the passage of gas to the burner and cutting off gas to the pilot in its second position, and cutting off gas to the burner and admitting gas to the pilot in its third position, means normally urging said valve to its second position, retaining means for rendering last said means inoperative when said valve is turned to its third position, and thermostatic responsive to increase of cooling element temperature for releasing said retaining means whereby said valve is returned to its second position.

9. In continuous absorption refrigerating apparatus, a gas burner for heating the generator, manually operable means for shutting off the supply of gas to said burner, and means responsive to increase of the cooling element temperature for turning on the supply of gas to said burner.

10. In continuous absorption refrigerating apparatus, generator heating means comprising a gas burner, manually operable means for shutting off the supply of gas to said burner, and a thermostat operative responsive to increase of the cooling element temperature for turning on the supply of gas to said burner.

11. In continuous absorption refrigerating apparatus, means for heating the generator, a thermostat for controlling said generator heating means to maintain a substantially constant cooling element temperature, manually operable means for shutting off the generator heating means, and means operated by said thermostat responsive to an increase in cooling element temperature above said substantially constant temperature for turning on said generator heating means.

12. In absorption refrigerating apparatus, a gas burner for heating the generator, a defrosting device comprising manually operated means for decreasing the supply of gas to the generator and automatic means responsive to increase of the cooling element temperature for increasing the supply of gas to said burner.

13. In absorption refrigeration apparatus including a gas burner for supplying heat, a defrosting device comprising means operable to decrease the supply of gas to said burner to cause increase in the cooling element temperature and automatically operative responsive to a predetermined increase in the cooling element temperature for resuming the supply of gas.

14. In absorption refrigeration apparatus including a gas burner for supplying heat, means for controlling the supply of gas to said burner to normally maintain a substantially constant cooling element temperature, means for modifying the effect of said control means to cause sufficient increase in the cooling element temperature for defrosting, and automatic means operative responsive to such increase in temperature of the cooling element for rendering said modifying means inoperative.

15. In continuous absorption refrigeration apparatus, a gas burner for heating the generator, a normally open valve in the burner supply line, manually operable means for closing said valve, means for retaining said valve in its closed position, and means responsive to a predetermined rise in temperature of the cooling element for releasing said retaining means to allow said valve to open.

16. In continuous absorption refrigeration apparatus, a gas burner for heating the generator, a normally open valve in the burner supply line, manually operable means for closing said valve, means for retaining said valve in its closed position, and a thermostat operative responsive to increase in temperature of the cooling element for releasing said retaining means to open said valve.

17. In continuous absorption refrigeration apparatus, a gas burner for heating the generator, means for controlling the size of the burner flame to maintain a substantially constant cooling element temperature, a normally open valve in the burner supply line, manually operable means for closing said valve, means for retaining said valve in its closed position, and means responsive to an increase in temperature of the cooling element above normal for releasing said retaining means and open said valve.

18. In continuous absorption refrigeration apparatus, a gas burner for heating the generator, a throttle valve for controlling the size of the burner flame, an expansible fluid thermostat for operating said throttle valve to maintain a substantially constant cooling element temperature, a normally open valve in the burner supply line, manually operable means for closing said normally open valve, a catch having adjustable tensioning means for retaining the last mentioned valve in its closed position, and means operative responsive to the opening movement of said throttle valve for overcoming the tension of said catch to release said normally open valve.

19. In continuous absorption refrigeration apparatus, a gas burner for supplying heat, and a thermostatic device for controlling flow of gas to said burner, said device being normally operative to maintain a substantially constant refrigeration temperature and manually operative to decrease the flow of gas to said burner independently of said normal operation to cause increase of said temperature, said device being automatically operative to resume said normal control responsive to a predetermined increase of said temperature.

20. In continuous absorption refrigeration apparatus, a heater, and a control device for said heater having a single thermostat, said control device being normally operative to maintain a substantially constant refrigeration temperature and manually operative to decrease the effect of said heater independently of said normal operation to cause increase of said refrigeration temperature, said device being automatically operative to resume said normal control responsive to a predetermined increase of said temperature.

21. In continuous absorption refrigeration apparatus, a heater, and a control device for said heater having a single expansible fluid thermostat, said control device being normally operative to maintain a substantially constant refrigeration temperature and manually operative to decrease the effect of said heater independently of said normal operation to cause increase of said refrigeration temperature, said device being automatically operative to resume said normal control responsive to a predetermined increase of said temperature.

22. In continuous absorption refrigeration apparatus, a heater, a thermostat for controlling said heater to maintain a substantially constant refrigeration temperature, manually operable means for shutting off said heater, and means operated by said thermostat responsive to an increase in said refrigeration temperature above said substantially constant value for turning on said heater.

23. In continuous absorption refrigeration apparatus, a gas burner for supplying heat, a thermostat for controlling the supply of gas to said burner to maintain a substantially constant refrigeration temperature, manually operable means for decreasing the supply of gas to said burner, and means operated by said thermostat responsive to an increase in refrigeration temperature above said constant value for resuming the flow of gas to said burner.

24. In continuous absorption refrigeration apparatus, a heater, an expansible fluid thermostat for controlling said heater to maintain a substantially constant refrigeration temperature, manually operable means for shutting off said heater, and means operated by said thermostat responsive to an increase in said refrigeration temperature above said substantially constant value for turning on said heater.

25. In continuous absorption refrigeration apparatus, a gas burner for supplying heat, an expansible fluid thermostat for controlling the supply of gas to said burner to maintain a substantially constant refrigeration temperature, manually operable means for decreasing the supply of gas to said burner, and means operated by said thermostat responsive to an increase in refrigeration temperature above said constant value for resuming the flow of gas to said burner.

26. In continuous absorption refrigeration apparatus, a gas burner for supplying heat, an expansible fluid thermostat for controlling the flow of gas to said burner to maintain a substantially constant refrigeration temperature, a valve for independently controlling the flow of gas to said burner, manually operable means for closing said valve, and means operated by said thermostat responsive to an increase in refrigeration temperature above said constant value for opening said valve.

27. In continuous absorption refrigeration apparatus, a gas burner for supplying heat, a first valve for controlling the flow of gas to said burner, an expansible fluid thermostat for operating said first valve to maintain a substantially constant refrigeration temperature, a second valve for controlling the flow of gas to said burner, manually operable means for closing said second valve, and means operated by said thermostat responsive to an increase in refrigeration temperature above said constant value for opening said second valve.

SIEGFRIED RUPPRICHT.

CERTIFICATE OF CORRECTION.

Patent No. 1,992,842.  February 26, 1935.

SIEGFRIED RUPPRICHT.

It is hereby certified that error appears in the printed specification of the above numbered patent requiring correction as follows: Page 3, first column, line 69, claim 8, before "responsive" insert the word means; and second column, line 25, claim 12, for "the generator" read said burner; and that the said Letters Patent should be read with these corrections therein that the same may conform to the record of the case in the Patent Office.

Signed and sealed this 9th day of April, A. D. 1935.

Leslie Frazer (Seal)  Acting Commissioner of Patents.